(12) United States Patent
Gordon

(10) Patent No.: US 7,310,712 B1
(45) Date of Patent: Dec. 18, 2007

(54) VIRTUAL COPY SYSTEM AND METHOD

(75) Inventor: David Stuart Gordon, Howden-le-Wear (GB)

(73) Assignee: Sun Microsystems, Inc., Santa Clara, CA (US)

( * ) Notice: Subject to any disclaimer, the term of this patent is extended or adjusted under 35 U.S.C. 154(b) by 439 days.

(21) Appl. No.: 10/865,299

(22) Filed: Jun. 10, 2004

(51) Int. Cl.
*G06F 12/00* (2006.01)
(52) U.S. Cl. .................................... 711/161
(58) Field of Classification Search ............ 711/113, 711/114, 161, 162, 165; 707/204; 714/6
See application file for complete search history.

(56) References Cited

U.S. PATENT DOCUMENTS 6,643,667 B1* 11/2003 Arai et al. ................. 707/200
2005/0120172 A1* 6/2005 Ozaki et al. ............... 711/114

* cited by examiner

*Primary Examiner*—Hiep T. Nguyen
(74) *Attorney, Agent, or Firm*—Meyertons Hood Kivlin Kowert & Goetzel, P.C.; B. Noël Kivlin

(57) ABSTRACT

A method of a copying data includes a cache subsystem loading data to be copied from a first address, and placing the data in a cache as if the data had been loaded from a second address. The data can then subsequently be written to the second address to effect the copy.

48 Claims, 5 Drawing Sheets

CPU, cache, and memory activity during data copying

```
       CPU     .LS--------+.SD---------+.LS--+.SD..+.LS--+.SD--+.LS--+.SD..+//............
T1 Cache      ..+??+------+..+??+------+..+??+..+??+..+??+..+??+..+??+..+??+.//.+------+..
   Memory     ......+~~RS~~+............................................//.+~~WD~~+......

CPU     .PW--+.PR--+.......+.LS--+.SD..+.LS--+.SD..+.LS--+.SD..+.LS--+.SD..+//......
T2 Cache      ..+??+..+??+------+..+??+..+??+..+??+..+??+..+??+..+??+.//.+------+..
   Memory     ......+~~RS~~+...........................................//.+~~WD~~+......

CPU     .FS-------+.+.+.+.+.+.+.+.DD---+.+.+.+.+.+.+.+.+.+............//.LD-------+
T3 Cache      ..+??+..+??+------+..+??+..+??+..+.+.+.+.+.+.+.+.+.+.........+~~WD~~+.//..+??+------+
   Memory     ......+~~RS~~+........................................+~~WD~~+.//......+~~RD~~+

CPU     .VC............//............//.VC............//.LD--+//...........
T4 Cache      ..+??+------+.//.+------+.//.+??+------+.//.+??+------+.//.+------+.
   Memory     ......+~~RS~~+.//.+~~WD~~+.//......+~~RS~~+.//............//.+~~WD~~+

VIRTUAL COPY SYSTEM AND METHOD

BACKGROUND OF THE INVENTION

The present invention relates to a computer system incorporating main memory, one or more cache subsystems, and one or more processors.

A substantial part of the work carried out by a typical computer system consists of copying data from one part of memory to another. This can be very time-consuming, as the CPU must issue a memory fetch from the source area, wait for the data to arrive, and then store the data to the destination memory area.

To alleviate some of the delays, cache subsystems have been added to many computers, so that when the CPU issues a memory fetch, the data may be found and retrieved from the faster, more local, cache memory rather than waiting for it to be fetched from main memory. Similarly, the cache subsystem can quickly accept data from the CPU and then write it back to main memory at a slower rate, so that the CPU need not wait for the completion of the transfer.

However, cache memory is relatively expensive, so in a typical system it can only hold a small portion of the main memory data, and cache misses can come to dominate processing, especially when copying large amounts of data.

Some CPUs attempt to reduce the effective delay and the number of cycles wasted while waiting for data by separating the fetch and use (store) phases in time. This may be done explicitly (as in most RISC architectures), by having separate "load" and "store" instructions between which the compiler or programmer can insert a suitable number of other independent instructions to fill the time until the loaded data may be referenced; or it may be implicit, with the CPU running code from a different thread, or dispatching instructions out of order, so that instructions that do not depend on the loaded data may proceed even though instructions which do depend on it are blocked; or some combination of these approaches.

A CPU may also provide a "prefetch" operation which tells the cache subsystem to start loading the referenced data (if not already cached) in anticipation of it being used in the near future, again reducing the latency when the data is referenced.

Operations that move more than a single unit of data per instruction may also be provided (e.g. an UltraSPARC™ has "block load" and "block store" instructions that load 64 bytes of data to or from 8 consecutive floating-point registers).

However, none of these approaches is truly satisfactory. Prefetching is often difficult to use to advantage, especially for relatively small blocks and with direct-mapped caches. Load-use separation and block load/stores are limited by the availability of critical CPU resources (e.g. registers or execution units) and the scheduling capabilities of the programmer, compiler, and CPU.

A different approach is to provide a separate dedicated DMA engine that can perform a copy operation independently, while the CPU continues to execute other instructions. This can provide a benefit in systems where large blocks of data are frequently copied, but it too has significant disadvantages. For example, it requires a fair amount of extra circuitry, either in a separate chip or as an additional functional unit within one of the existing chips, and therefore increases system cost. For each transfer, the DMA engine typically has to be programmed explicitly with source, destination, and size, and so the start-up overhead can be quite high. Also, a DMA engine can typically only use physical addressing, so in a system where the CPU normally works with virtual addresses, there can be extra overhead as the source and destination addresses for each copy must be translated, and a single (logical) block copy may have to be broken up into several physical block copies if the virtual addresses do not map to contiguous physical memory. Perhaps most inconvenient of all, it requires some form of synchronization at the completion of each copy, so that the CPU does not try to use data in the destination block before the DMA engine has written it. Whether polling or interrupts are used, it still represents a significant overhead and a possible source of programming errors if the synchronization rules are violated. These overheads in cost and time typically mean that it is only worth using a DMA engine in systems where a large proportion of the workload consists solely of copying whole, aligned, and contiguous pages of data.

SUMMARY OF THE INVENTION

An aspect of the invention provides a cache subsystem which is configured to load source data to be copied from a first (source) address and to place the data in a cache as if the had been loaded from a second (destination) address, whereby the data can be subsequently written to the second address.

Other aspects of the invention provide a computer system including such a cache subsystem and a method of operation of such a cache subsystem.

An embodiment of the invention can enable the effect of a copy to be achieved without a CPU actually having performed a copy. The majority of the work of copying data can thus be offloaded from the CPU to the cache subsystem, by means of a new operation. The operation effected by an embodiment of the invention is hereinafter referred to as a "virtual copy".

In one example embodiment of the present invention a cache subsystem is requested to load data to be copied from a first (source) address into a first cache line, to internally copy this data to a second cache line mapped to a second (destination) address, and to mark the second cache line as dirty (modified), thereby causing the data to be written to the destination address, either immediately or at some later time.

In another example embodiment of the invention, a cache subsystem is requested to load source data from a first address but to tag it in the cache as though it had been loaded from a second (destination) address and modified, so that after being loaded from a source address the data is subsequently written "back" to the destination address.

In a further example embodiment of the invention, a cache subsystem is requested to change the address with which data already held in a cache line is associated and to mark the cache line dirty, so that the data is subsequently written "back" to a destination address even though it had originally been loaded from a source address.

Each of these embodiments achieves the effect the data having been copied without it actually having been copied by the CPU. It should be understood that these example embodiments are not mutually exclusive, and an implementation of the invention may embody any combination thereof. Indeed, from the description of particular embodiments hereinafter, it will be it will be appreciated that yet further example embodiments of the invention can be envisaged.

A further aspect of the invention (which may be implemented, for example, as an optional extension to any of the above example embodiments) provides a mechanism by which the CPU and thereby software executing on the CPU can exercise control over the cache residency of the source and/or destination data after the completion of the virtual copy operation.

In an example implementation, a CPU can perform a virtual copy operation by requesting the cache subsystem appropriately, passing to the cache controller the address from which data is to be loaded (the source address) and the address to which it is to be "virtually copied" (the destination address), plus the optional cache residency control flags if implemented. The cache subsystem may then, for example, use any of the example embodiments to achieve the effect of the source data being copied to the destination address.

In the descriptions herein reference is made to copying data from a single address to another. However, it should be understood that a larger block of data associated with a range or set of source and destination addresses may be copied in a like manner.

Accordingly, an embodiment of the invention can enable the copying of data in which a cache subsystem arranges that data from a first address be held in a cache line associated with a second address and marked as dirty, so that the said data will sooner or later be written to the destination address, thus achieving the effect of a copy without the CPU actually having performed one.

An embodiment of a "virtual copy" operation according to the invention can yield significant benefits for several reasons. For example, an embodiment can allow the CPU's execution unit(s) to continue with other instructions even while the copy is in progress. An example embodiment can reduce or even eliminate the use of critical CPU resources (e.g. registers) by the copying process, as the data does not have to be first loaded and then stored by the CPU. An example embodiment can virtually eliminate the start-up costs associated with other methods of copying data. It can avoid any requirement to issue prefetches, or to translate virtual addresses to physical, or to make an explicit check for completion of the copy. Because access to the destination line is controlled by the cache, if the CPU references the destination data before that data is available, it will simply wait, just as it would during a cache miss. This will reduce the benefit of the "virtual copy", but will still yield correct operation in all cases.

An example embodiment of the present invention can thus overcome the disadvantages of the existing methods and allow more efficient and convenient copying of data from one location in main memory to another.

BRIEF DESCRIPTION OF THE DRAWINGS

Embodiments of the present invention will be described hereinafter, by way of example only, with reference to the accompanying drawings in which like reference signs relate to like elements and in which:

FIG. 5 represents a number of traces illustrating memory operations in examples of conventional copy operations and virtual copy operations according to embodiments of the invention.

Figure 1:
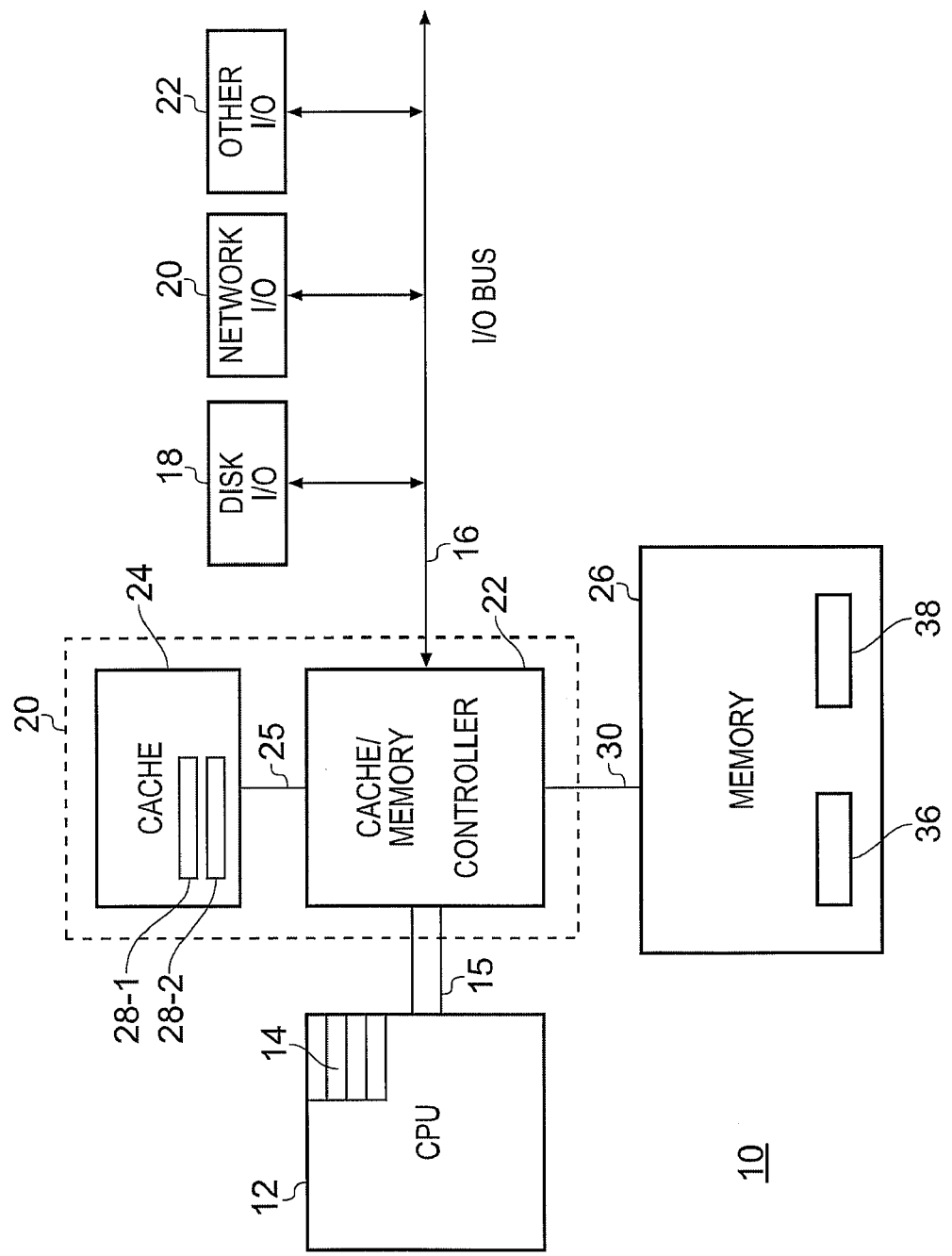
FIG. 1 is a schematic block diagram of components of a computer system implementing an embodiment of the invention.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims. In this regard, combinations of features from the independent claims with features of dependent claims other than as presented by the dependencies of the claims, and also with features from the description, are envisaged.

DESCRIPTION OF PARTICULAR EMBODIMENTS

FIG. 1 is a schematic block diagram of elements of a computer system of an embodiment of the present invention.

FIG. 1 illustrates a computer system 10 that includes a processing unit (here central processing unit or CPU) 12. The processing unit can include a plurality of registers 14. The processing unit is connected via processor bus 15 to a cache subsystem 20 for caching data for use by the processing unit. The cache subsystem 20 can include a cache controller (here a cache/memory controller) 22 and a cache memory 24, for example a cache memory typically described as a second level cache. The processing unit can also include a first level cache (not shown). The cache subsystem 20 is connected via an I/O bus 16 to various I/O subsystems, such as, for example, disk I/O 18, network I/O 20 and other I/O 22 subsystems. In the illustrated example, main memory 26 is connected to the cache subsystem via a memory bus 30.

It will be appreciated that FIG. 1 provides a simplified overview of elements of one example of a computer system useful for understanding the present invention. Although FIG. 1 illustrates a system including a single processing unit, the invention is not limited thereto. Indeed, as will be appreciated from the following description, the present invention can be implemented on widely differing system architectures. Indeed, the architecture could differ in other ways as well. For example, rather than the above example where a cache controller and a memory controller are implemented as a combined unit, the cache controller and the memory controller could be implemented by separate units. Alternatively, or in addition, the cache controller and the processor/CPU could be implemented in a single unit.

A simplified summary of a typical operation of the computer system of FIG. 1 will now be described, wherein the processing unit issues a request to the cache subsystem 20 for the data held in a source memory location 36 in the memory 26. The cache controller 22 of the cache subsystem 20 is operable to accept such a request. If the cache controller 22 identifies that the requested data is held in the cache memory 24, it will read that data from the cache memory, and supply this to the processing unit 12. Alternatively, if the data is not held in the cache memory 24, the cache controller 22 is operable to fetch that data from the source location 36, to cache that data in a cache line 28-1 in the cache memory 24, associated with the source memory location 36 and to supply that data to the processing unit 12.

The processing unit can also be operable to write to a destination memory location 38. The cache controller 22 of the cache subsystem 20 is operable to receive a write request. If the cache controller 22 identifies that a cache line 28-2 in the cache memory 24 is already associated with the destination location 38, then it will update the data held in that cache line 28-2 with the data to be written and will also write that data to the destination memory location 38 in the memory 26 immediately or at some later time. Alternatively, if a cache line is not already associated with the destination memory location, then the cache controller 22 can be operable to allocate a cache line 28-2 to the destination memory location 38 and then to write the data to that cache line 28-2 and to write that data to the destination memory location 38 in the memory 26 immediately or at some later time.

Figure 2:
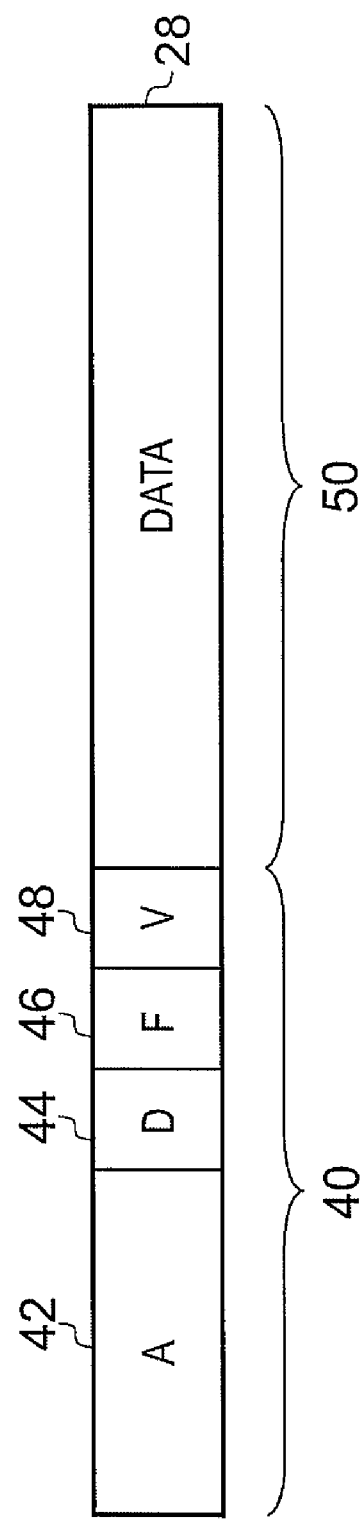
FIG. 2 is an illustration of a cache line.

The cache memory can be configured in any conventional manner. In the present example the cache memory 24 is assumed to be configured as a fully associative memory, whereby the cache memory is configured as a plurality of cache lines that include data and a set of tags, including an address tag, whereby the address tag can be set dynamically to associate that cache line with a corresponding portion of memory. FIG. 2 illustrates an example of the configuration of a cache line 28 in a cache memory 24. This includes a tag portion 40 that includes tags including at least an address tag 42 for associating the cache line with an address in main memory, a dirty tag 44 for indicating whether the associate data is to be considered clean or dirty, a fill pending tag 46 for indicating whether a cache fill operation is pending, a valid tag 48 for indicating whether the data is valid, and a data portion 50 for containing the associated data. The cache controller can be operable to set the tags in the tag portion for each of the cache lines, and the cache memory can be operable to perform an associative search for a memory address of interest according to the content of the address tags.

In the following, various examples of embodiments of the invention are described. The various embodiments all provide different implementations of a virtual copy operation. In embodiments of the invention, the cache controller can be operable to perform steps of the method. The cache controller can be implemented as an integrated circuit, or as part of an integrated circuit, which can also include a processing unit and/or a memory controller and/or at least part of the cache memory. In some embodiments, the cache controller can comprise special purpose logic for implementing the invention. For example it can comprise an Application Specific Integrated Circuit (ASIC) or a Field Programmable Gate Array (FPGA). In some embodiments the cache controller can comprise a microcontroller or microprocessor programmed by means of firmware and/or software. Indeed, some embodiments of the cache controller can comprise a combination of special purpose and programmable elements.

A virtual copy operation can be initiated by the processor in various different ways, dependent upon the processor architecture.

For example, in an example embodiment, a new "vcopy" instruction could be provided, or a modifier (e.g. a prefix byte) to an existing "copy string" instruction. This requires an actual change to the instruction set of the processor, and is probably better suited to CISC architectures than to RISC processors, given that opcodes for such RISC machines do not usually include two memory address operands.

In another embodiment, a virtual copy operation can be initiated by means of an access to one or more internal resources of the processor such as registers. For example, a program can first place the source address into a specified register, and then initiate the copy by the action of placing the destination address in a specific dedicated register. In SPARC assembler notation, this might be:

wrasr src, % vsrc wrasr dst, % vdst using the existing SPARC "wrasr" instruction with a pair of new implementation-specified registers.

In a third example embodiment, the copy is initiated by means of an access to a specific I/O or alternate-space address, effectively treating the cache controller as a co-processor or peripheral (rather like an external DMA controller) and accessing one or more resources internal thereto.

In an M68K-type system, this could use a "move to CMMU" instruction; or, in a SPARC architecture, an instruction such as:

stxa % rs, [% rd]ASI_VCOPY where the specific Address Space Identifier that indicates that this alleged "store" instruction will actually access resources within the cache controller that will cause it to perform the virtual copy operation. Both the memory destination address (which here appears to be an address within the cache controller itself) and the memory source address (which here appears as though it were a register data value to be stored!) would be passed to the cache controller by means of this single instruction. This mechanism may require no alterations to the CPU core at all. An existing instruction is used to pass the parameters for the virtual copy to the cache controller. Where the cache controller is a separate and independently replaceable module, this could even allow a system to be upgraded to virtual copy capability without replacing the CPU.

These are just a few examples of how virtual copy operations might be integrated into the instruction set of a processor, and further processor- and implementation-dependent means of initiating the virtual copy operation can readily be devised.

In a first set of embodiments, an implementation of a virtual copy operation performed in response to such a virtual copy instruction is to copy data from one line to another within the cache subsystem. In a second set of embodiments, an implementation of a virtual copy operation performed in response to such a virtual copy instruction is to reroute data during memory fetch/write operations and/or rewrite cache tags. The internal copy approach of the first set of embodiments can be simpler conceptually and in implementation. However the rerouting/retagging approach of the second set of embodiments can potentially provide higher performance and/or greater flexibility. In some embodiments an implementation of the virtual copy operation can use copying in some cases and rerouting in others.

Figure 3:
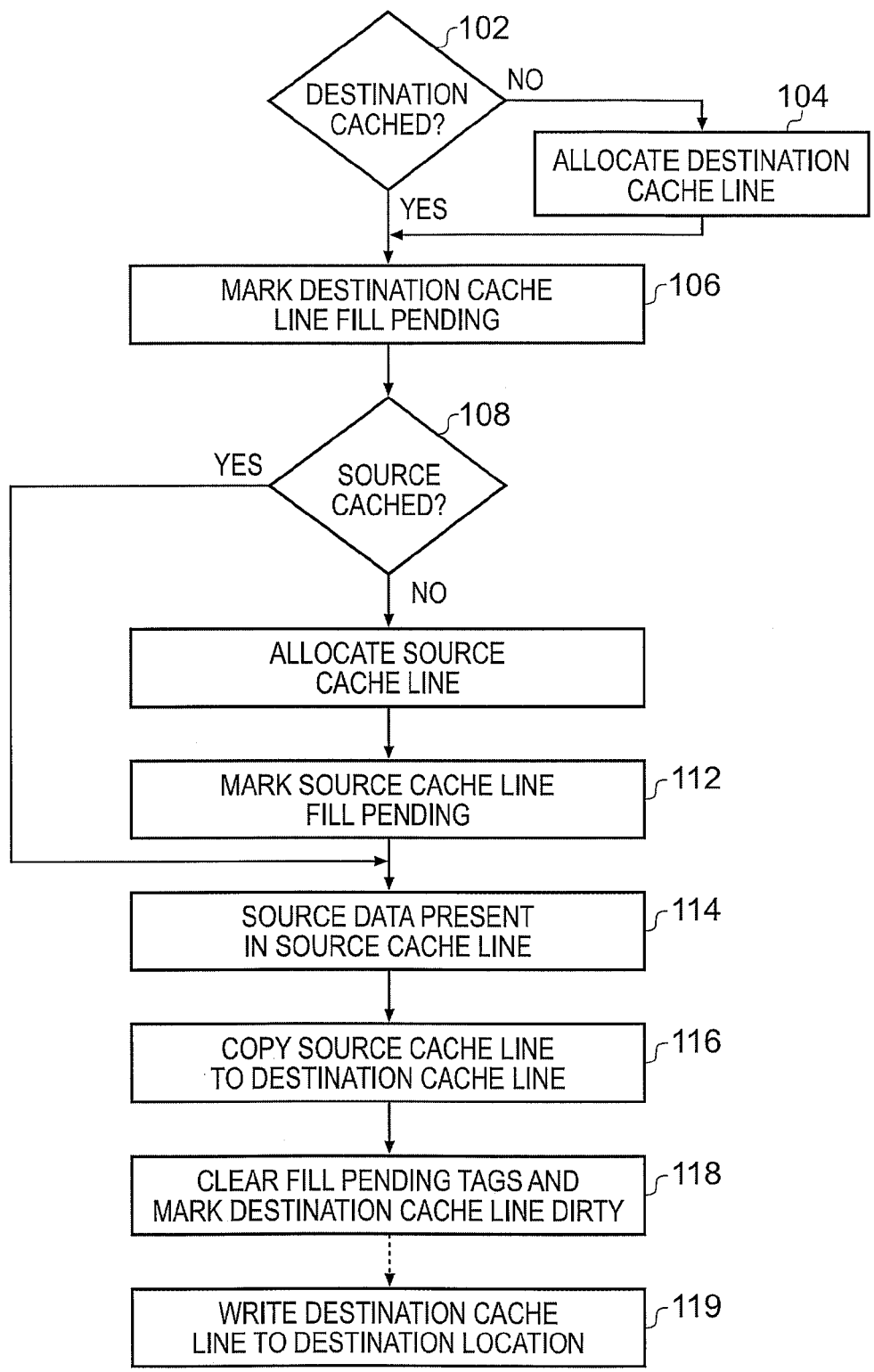
FIG. 3 is a flow diagram illustrating on example of a virtual copy operation.

FIG. 3 is a flow diagram illustrating one example of an embodiment of the first set (an internal copy approach). In response to a virtual copy instruction, in order to implement a virtual copy operation in this example, the cache controller can operate as indicated at C1 to C4 below.

C1. If, in step 102, the cache controller 22 determines that data for the destination location 38 is not already cached, then, in step 104, the cache controller 22 is operable to allocate a cache line 28-2 for it by setting the address tag 42 of the cache line 28-2 for the destination location.

C2. In step 106, the cache controller 22 is operable to mark the cache line 28-2 for the destination "fill pending" by setting the fill pending tag 46 for that cache line 28-2 so that the content cannot be used to satisfy any subsequent request by the CPU. In systems that support caching by multiple agents, the cache controller 22 may issue an "invalidate" for the destination address on the system bus (if it was not cached, or was cached "shared"). There is no need to load any data for the destination line (from memory or another cache), as the entire line will be overwritten anyway; in this respect the operation is no different from what would have happened had the CPU written to the (entire) line.

C3. If, in step 108, the cache controller 22 determines that data for the source location 36 is not already cached, then, in step 110, the cache controller 22 is operable to allocate a cache line 28-1 for the source location (i.e. a cache line different from that for the destination location) by setting the address tag for the source location and initiating a fill from memory. Until the data arrives, the cache controller 22 is operable in step 112 to also mark the cache line 28-1 associated with the source location "fill pending" by setting the fill pending tag 46 for that cache line 28-1.

C4. Once the source data is present, at step 114, in the source cache line 28-1, then in step 116, the cache controller 22 can copy this to the cache line 28-2 associated with the destination location. The cache controller 22 can then be operable to clear both fill pending tags 46, and at the same time, to mark the cache line 28-2 associated with the destination location "dirty" by setting the dirty tag 44 for that cache line. The "virtual copy" operation is now complete, and, in step 119, the destination data can be written back to the destination location 38 in the memory 26 and/or supplied to the CPU on demand.

Figure 4:
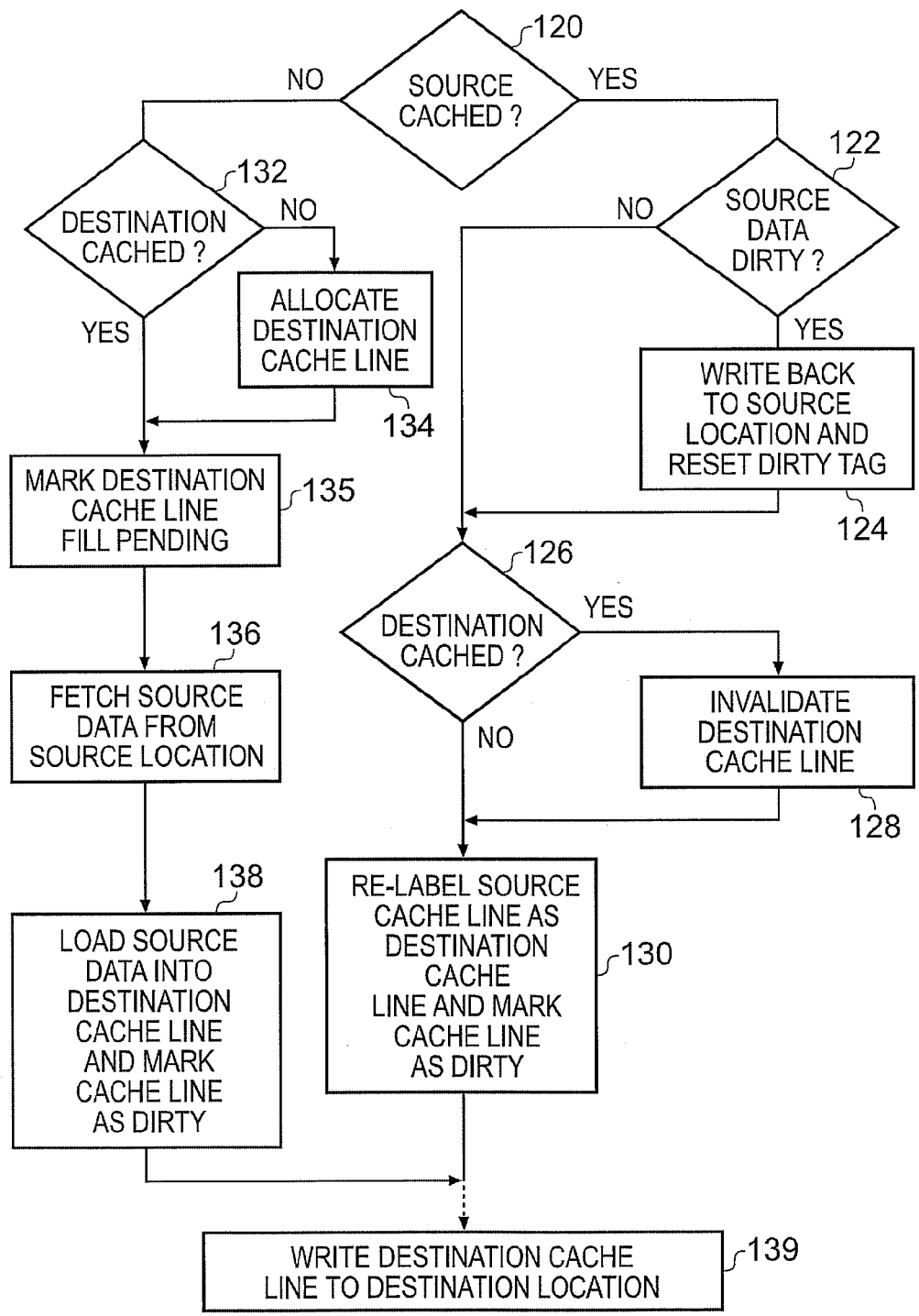
FIG. 4 is a flow diagram illustrating another example of a virtual copy operation.

FIG. 4 is a flow diagram illustrating one example of an embodiment of the second set (a non-copying approach). In response to a virtual copy instruction, in order to implement a virtual copy operation in this example, the steps performed by the cache controller can depend on whether the source and/or destination addresses are found in the cache as indicated at N1 to N2.2 below.

N1. If, in step 120, the cache controller 22 determines that the source has already been cached in a cache line 28-1 associated with the source location 36, then the following steps can follow.

N1.1. If, in step 122, the cache controller 22 determines that the source data is dirty (i.e. the dirty tag 44 for the cache line 28-1 is set), then, in step 124, the cache controller 22 initiates a writeback so that source data in the cache line 28-1 becomes clean and resets the dirty tag 44 for that cache line. (The remaining steps do not, however, have to wait for this writeback to complete.)

N1.2. If, in step 126, the cache controller 22 determines that a cache line 28-2 is already allocated to the destination location, then, in step 128, the cache controller 22 invalidates this cache line by resetting the valid tag 48 for that cache line 28-2.

N1.3. In step 130, the cache controller 22 is operable to re-label the source line (i.e. the address tag 42 is changed) so that it becomes allocated to the destination location. The cache controller 22 then also marks the cache line as dirty by setting the dirty tag 44.

N2. If, in step 120, the cache controller 22 determines that the source is not cached:

N2.1. If, in step 132, the cache controller 22 determines that the destination is also not already cached, then the cache controller 22 is operable in step 134 to allocate an available cache line 28-2 for the destination location by setting the address tag 42.

N2.2. In step 135, the cache controller is operable to set the fill pending tag 46 in the cache line 28-2. In step 136, the cache controller 22 is then operable to fetch the data from the source location 36 in main memory. When the data arrives, however, the cache controller is operable in step 138 to reroute that data into the cache line 28-2 allocated to the destination location and mark it as dirty by setting the dirty tag 48 for that cache line.

The "virtual copy" operation is now complete, and, in step 139, the destination data can be written back to the destination location 38 in the memory 26 and/or supplied to the CPU on demand.

As mentioned above, the example implementations described above assume a fully associative cache, whereby any line can be relabeled to correspond to any address in memory.

The implementation of the "virtual copy" operation can be dependent upon the associativity of the cache subsystem, e.g.:

fully associative cache;
  n-way associative cache (n is typically 4 or 2); or
  1-way (direct-mapped) cache.

The associativity of a particular example of a cache memory can place different constraints on the location of data in the cache, relative to its address in main memory. In a fully associative cache, any line of the cache can hold data from any address in main memory. In an n-way cache each line of memory data may be found only in one of n locations in the cache. In a direct-mapped cache, the data for a given line of memory must occupy a specific cache line.

Caches of lower associativity than a fully associative cache can nonetheless implement "virtual copy", using, for example, the internal copy approach (as indicated at C4 above). The "internal copy" technique could alternatively be used on a source hit, with rerouting of incoming data (as indicated at N2.2 above) on a source miss. In this case, the cache line allocated in step N2.1 above should correspond to the alignment of the destination location, even though it is to be filled from the source address.

A more limited implementation which supports only the simpler cases could also be provided, with hardware or software checking whether the implementations constraints have been met in particular cases.

For example, in a direct-mapped cache virtual copy could be implemented using internal copying, as the data for any particular location in memory is held in one specific line of the cache. An exception could be where the source and destination addresses both map to the same cache line. In this case, the virtual copy could be implemented by re-labeling (as the source and destination lines cannot both be held in the cache at the same time).

In the case of an n-way cache, aliased addresses (where both map to the same set of n cache lines) present no special difficulty. The virtual copy operation can be implemented either by renaming or by copying (from one line of the set to another in the same set). As supporting both cases would add complexity and cost to the implementation, the equally aligned case could be forbidden in an implementation. Alternatively, an implementation might support a virtual copy operation only between equally aligned addresses. Although this is less general, this could be useful for specific tasks such as copying whole pages of memory.

The overall performance of a computer system (whether or not it implements the virtual copy operation) can depend upon the way in which copied data is treated with respect to its residency in the cache after the (real or virtual) copy completes. In some cases, it can be advantageous for source or destination data to remain cached, whereas in other applications this will decrease overall performance.

Optionally, therefore, the virtual copy operation may explicitly specify the treatment of the source and destination addresses with respect to caching after the copy. For each of source (S) and destination (D), there are five main options:

1. the address should always appear in the cache after the copy;
2. the address should remain cached if it was already cached (clean or dirty);
2.1 the address should remain cached if it was already cached and clean;
2.2 the address should remain cached if it was already cached and dirty (however, the dirty copy of the source may be implicitly made clean by the virtual copy operation, as suggested in (N1.1), unless sub-option (a) here is used);
3. the address should never remain in the cache once the copy is complete.

Further parameters may also control writeback, namely sub-options that:

a) the data should not be written back to the address in main memory at this time, even if dirty;
b) the writeback of dirty data should be deferred until the time determined by any other cache control mechanism (e.g. displacement by other data);
c) the writeback of dirty data to main memory should be expedited.

In the following reference will be made to options for the source S or destination D including a main option and a sub-option (e.g., S2a represents main option 2 and sub-option (a) for the source, and D3c represents main option 3 and sub-option (c)).

Software can be configured to select the most appropriate version according to an expected use of the source and/or destination areas. For example, when copying from a software-maintained bitmap to a frame buffer, the source status (using options S2a or S2b) could be preserved as the software may or may not update it again soon, but the destination data (which is never read back) could be written as soon as possible and then invalidated (option D3c). Alternatively, if data were being copied from a DMA buffer into a kernel data structure, the destination could be kept cached (option D1b) as the copied data is likely to be used in the near future, but the source could be invalidated even if it were already cached and/or dirty (option S3a) as the DMA device will overwrite the buffer before the software references it again. It should be noted that S3a deliberately allows source data modified by the processor/CPU to be discarded rather than written back to memory. Although this would violate the normal rules of cache coherency, this can yield a performance benefit as a subsequent write by the DMA device (in particular, a part-line write) will not have to wait for the dirty data to be delivered from the cache, only for it to be overwritten. Options S1a, S2a, and S2.2a do not imply that any dirty data is discarded, only that the writeback should not or need not be done immediately as the dirty data can continue to sit in the cache until removed by some other mechanism.

A specific implementation may not provide all of the described options. For example, a pure no-copy implementation might not provide options S2a+D1b, as together they imply duplication of the same data in two cache lines (contrary to the "no-copy" policy) if the source is already cached. In a pure copy implementation, some options may be omitted as they provide no benefit, given that both source and destination cache lines must be allocated anyway. Also, if the cache is implemented as write-through, rather than writeback, then sub-option (c) is implicit for all destinations.

A further variation on the caching options is to treat them as advisory rather than mandatory. Whereas a mandatory invalidate requires the cache subsystem to perform the specified action, an advisory invalidate can simply tell it to flag the line for early reuse, or promote it to the head of a list of lines to be overwritten when required. Likewise, a mandatory keep might imply locking the line into the cache, whereas an advisory keep could put the line on the tail of the list of lines to reuse, or flag it as recently-used if a least recently used LRU policy is employed.

FIG. 5 illustrates a comparison of CPU, cache, and memory activity that can occur during copying in a conventional system and in an example embodiment of the invention. Table 1 below provides a key to the symbols used in FIG. 5 and in the following description.

TABLE 1

| Symbol | Entity | Activity |
| --- | --- | --- |
| LS | (CPU) | Load from Source address |
| LD | (CPU) | Load from Destination address |
| SD | (CPU) | Store to Destination address |
| PW | (CPU) | Prefetch for Write |
| PR | (CPU) | Prefetch for Read |
| FS | (CPU) | Fetch (block) from Source address |
| DD | (CPU) | Dump (block) to Destination address |
| VC | (CPU) | Initiate Virtual Copy |
| ?? | (Cache) | Lookup, tag match |
| ~~RS~~ | (Memory) | Read from Source address |
| ~~RD~~ | (Memory) | Read from Destination address |
| ~~WD~~ | (Memory) | Write to Destination address |
| . . . | (All) | Idle/Free |
| ------ | (CPU/Cache) | Waiting |
| + | (All) | Data exchange |
| // | (All) | Arbitrary time interval |

Trace T1 illustrates an example of a conventional of a copy loop, using only simple move (load and store) operations, on a CPU that doesn't overlap instructions and memory access. As can be seen, most of the time is spent waiting for data to be transferred between CPU, cache, and memory.

The initial ~~RD~~ occurs on the first store, as it then constitutes a partial-line write and so forces the cache to acquire the old data, even though it is all going to be overwritten. The final ~~WD~~ is shown as occurring at some arbitrary time later, when the destination line is displaced from the cache by other data.

Trace T2 illustrates an example of a conventional implementation of a copy loop with the addition of prefetch instructions. The PW tells the cache that the whole of the destination is going to be overwritten, so a cache line is allocated for it but not filled from memory. The PR initiates the read of the source data, and the CPU then has some spare cycles that it might be able to use for other instructions, rather than just waiting. Thereafter the transfers proceed at cache speed, since both source and destination addresses now hit in the cache every time; but there is still an overhead of checking for this hit on each transfer.

Trace T3 illustrates an example of a conventional block load/store implementation. The FS instruction initiates the fetch of the whole cache line, but in this example, the CPU<->cache interface can only transfer one word (register) at a time. Thus it takes a sequence of eight transfers to move the whole line of data to the CPU, and likewise eight transfers to move it back again. Each of them is faster than the CPU-initiated loads in Trace 2, however, as there is no need to check for a cache hit on each operation separately. Also, the CPU may be able to continue executing other instructions while these transfers are progressing (note the '.'idle /free cycles), as long as there is no interlock between the registers being loaded/stored and those needed by the other instructions.

The last part of Trace T3 shows what happens if the block store is implemented as non-allocating and the destination missed in the cache, but is then referenced: the recently-stored data must be re-fetched from memory. Giving the copy operation the option of specifying the cache treatment of the source and destination should help avoid this situation.

Trace T4 shows an example of a virtual copy operation in accordance with an embodiment of the invention, where the source misses in the cache, and the destination may either hit or miss. The cache initiates a load from the source, and once it has the data, copies, reroutes, or re-labels it to the destination line. Some time later, the line is written back. The CPU has not had to be involved at all.

Finally, trace T5 shows the same virtual copy operation (with cache control option D1b), but this time the CPU accesses the destination data shortly after the copy (as at the end of Trace T3). This illustrates that in this case, the data can be sourced by the cache and need not be re-fetched from memory.

Accordingly, as will be appreciated from FIG. 5, an embodiment of the invention can be employed to copy blocks of data between memory locations using a virtual copy operation.

There has been described a method, apparatus and a computer program product for copying data includes a cache subsystem loading data to be copied from a first address, and placing the data as if the data as if the data had been loaded from a second address. The source data can then subsequently be written to the second address to effect the copy.

Although particular examples of the invention have been described, it will be appreciated that the invention is to cover all modifications, equivalents and alternatives falling within the spirit and scope of the present invention as defined by the appended claims.

What is claimed is:

1. A method of a copying data, the method comprising a cache subsystem loading data to be copied from a first address,
    placing the data in a cache as if the data had been loaded from a second address,
    marking the data as modified even though the data has not been modified, and
    subsequently writing the data to the second address to effect the copy.

2. The method of claim 1, wherein, in order to place the data in the cache as if the data had been loaded from a second address and modified, the data is initially cached in a first cache location associated with the first address, the data is then copied within the cache subsystem to a second cache location associated with the second address and the second cache location is marked as dirty.

3. The method of claim 2, wherein the cache subsystem marks a cache location allocated to the second address as "fill pending".

4. The method of claim 3, wherein the cache subsystem loads data from memory to a cache location allocated to the first address.

5. The method of claim 4, wherein the first cache location is marked as "fill pending" until the data from the loaded data is received in the first cache location.

6. The method of claim 5, wherein, after the data is received in the first cache location, the data is copied to the second cache location.

7. The method of claim 6, wherein the "fill pending" marking is removed from the second cache location and the second cache location is marked as dirty.

8. The method of claim 1, wherein, in order to place the data in the cache as if the data had been loaded from a second address and modified, the data is loaded from the first address into a cache location, the association of the cache location is set so that it is associated with the second address, and the cache location is marked as dirty.

9. The method of claim 1, wherein, in order to place the data in the cache as if the data had been loaded from a second address and modified, the data is cached in a first cache location initially associated with the first address, the association of the first cache location is changed so that it is associated with the second address and the cache location is marked as dirty.

10. The method of claim 9, wherein, where data already cached in the first cache location is marked as dirty, a writeback is initiated to make it clean.

11. The method of claim 9, wherein, where a second cache location is associated with the second address and data is cached in the first cache location, the second cache location is invalidated, an address tag of the first cache location is changed to associate first cache line with the second address, and the first cache location is marked as dirty.

12. The method of claim 9, wherein, where a cache location is not associated with either the first address or the second address, a cache location is associated with the second address, data is fetched from the first address, the data is cached in the cache location associated with the second address and the cache location associated with the second address is marked as dirty.

13. A cache subsystem, the cache subsystem comprising:
    a controller; and
    a cache;
    wherein the controller is configured to load data to be copied from a first address and to place the data in the cache as if the data had been loaded from a second address;
    wherein the controller is further configured to mark the data as modified even though the data has not been modified; and
    wherein the controller is configured to write the data to the second address to effect a copy of the data from the first address to the second address subsequent to marking the data as modified.

14. The cache subsystem of claim 13, operable, in order to place the data in the cache as if the data had been loaded from a second address and modified, initially to cache the data in a first cache location associated with the first address, and then to copy the data within the cache subsystem to a second cache location associated with the second address and to mark the second cache location as dirty.

15. The cache subsystem of claim 14, operable to mark a cache location allocated to the second address as "fill pending".

16. The cache subsystem of claim 15, operable to initiate a load operation from memory to a cache location allocated to the first address.

17. The cache subsystem of claim 16, operable to mark the first cache location as "fill pending" until the data from the load operation is received in the first cache location.

18. The cache subsystem of claim 17, operable after the data is received in the first cache location, to copy the data to the second cache location.

19. The cache subsystem of claim 18, operable to remove the "fill pending" marking from the second cache location and to mark the second cache location as dirty.

20. The cache subsystem of claim 13, operable, in order to place the data in the cache as if the data had been loaded from a second address and modified, to load the data from the first address into a cache location, to set the association of the cache location so that it is associated with the second address and to mark the cache location as dirty.

21. The cache subsystem of claim 13, operable, in order to place the data in the cache as if the data had been loaded from a second address and modified, to cache the data in a first cache location initially associated with the first address, to change the association of the first cache location so that it is associated with the second address and to mark the cache location as dirty.

22. The cache subsystem of claim 21, operable, where data already cached in the first cache location is marked as dirty, to initiate a writeback to make it clean.

23. The cache subsystem of claim 21, operable, where a second cache location is associated with the second address and data is cached in the first cache location, to invalidate the second cache location, to change an address tag of the first cache location to associate first cache line with the second address, and to mark the first cache location as dirty.

24. The cache subsystem of claim 21, operable, where a cache location is not associated with either the first address or the second address, to associate a cache location with the second address, to fetch data from the first address and to cache said data in the cache location associated with the second address and to mark the cache location associated with the second address as dirty.

25. A computer system comprising a processing unit, memory and a cache subsystem, the cache subsystem being configured to:
   load data to be copied from a first address in memory and to place the data in a cache as if the data had been loaded from a second address in memory;
   mark the data as modified even though the data has not been modified; and
   write the data to the second address in memory to effect a copy of the data from the first address to the second address subsequent to marking the data.

26. The computer system of claim 25, operable, in order to place the data in the cache as if the data had been loaded from a second address and modified, initially to cache the data in a first cache location associated with the first address, and then to copy the data within the cache subsystem to a second cache location associated with the second address and to mark the second cache location as dirty.

27. The computer system of claim 26, operable to mark a cache location allocated to the second address as "fill pending".

28. The computer system of claim 27, operable to initiate a load operation from memory to a cache location allocated to the first address.

29. The computer system of claim 28, operable to mark the first cache location as "fill pending" until the data from the load operation is received in the first cache location.

30. The computer system of claim 29, operable after the data is received in the first cache location, to copy the data to the second cache location.

31. The computer system of claim 30, operable to remove the "fill pending" marking from the second cache location and to mark the second cache location as dirty.

32. The computer system of claim 25, operable, in order to place the data in the cache as if the data had been loaded from a second address and modified, to load the data from the first address into a cache location, to set the association of the cache location so that it is associated with the second address and to mark the cache location as dirty.

33. The computer system of claim 25, operable, in order to place the data in the cache as if the data had been loaded from a second address and modified, to cache the data in a first cache location initially associated with the first address, to change the association of the first cache location so that it is associated with the second address and to mark the cache location as dirty.

34. The computer system of claim 33, operable, where data already cached in the first cache location is marked as dirty, to initiate a writeback to make it clean.

35. The computer system of claim 33, operable, where a second cache location is associated with the second address and data is cached in the first cache location, to invalidate the second cache location, to change an address tag of the first cache location to associate first cache line with the second address, and to mark the first cache location as dirty.

36. The computer system of claim 33, operable, where a cache location is not associated with either the first address or the second address, to associate a cache location with the second address, to fetch data from the first address and to cache said data in the cache location associated with the second address and to mark the cache location associated with the second address as dirty.

37. The computer system of claim 25, wherein the processing unit has control over the residence of the data in the cache subsystem following the copying of the data.

38. A cache subsystem operable to perform a virtual copy operation, the cache subsystem being operable to load data from a source address and place the data in the cache as if it had been received from a destination address and modified.

39. A computer system comprising a processing unit, memory and a cache subsystem, wherein the processing unit is operable to request that the cache subsystem performs a virtual copy operation between a source address and a destination address, and the cache subsystem is operable, in response to said request, to load data from the source address, and to place the data in the cache as if it had been received from the destination address; and
   wherein the cache subsystem is further operable to mark the data as modified even though the data has not been modified subsequent to placing it in the cache.

40. The computer system of claim 39, wherein the processing unit is operable to write the cached data to the destination address subsequent to marking the data as modified.

41. The computer system of claim 39, in which software executing on the processing unit exercises control over the cache residency of the data after the completion of the virtual copy operation.

42. A cache subsystem configured to be responsive to a virtual copy request:
   to load data to be copied from a source address into a first cache line;
   to internally copy this data to a second cache line mapped to a destination address; and
   to mark the second cache line as dirty even though the data has not been modified, thereby causing the data to be written to the destination address, either immediately or at some later time.

43. A cache subsystem configured to be responsive to a virtual copy request, wherein responding to the virtual copy request causes the cache subsystem:
   to load source data from a source address; and
   to tag the data in the cache as though it had been loaded from a destination address, and
   to tag the data as modified even though the data has not been modified, so that after being loaded from the source address the data is subsequently written back to the destination address.

44. A cache subsystem configured to be responsive to a virtual copy request, wherein responding to the virtual copy request causes the cache subsystem:
   to change the address with which data already held in a cache line is associated; and
   to mark the cache line dirty even though the data held therein has not been modified, so that the data is subsequently written back to a destination address even though it had originally been loaded from a source address.

45. A cache subsystem comprising means for performing a virtual copy operation in which data is loaded from a source address and is placed in the cache as if it had been received from a destination address and modified even though the data has not been modified.

46. A computer system comprising:
   processing means for requesting a virtual copy operation between a source address and a destination address in memory, and
   cache means for responding to the virtual copy operation request by performing a virtual copy operation in which data is loaded from a source address and is placed in the cache as if it had been received from a destination address and in which the data is marked as modified even though the data has not been modified.

47. The computer system of claim 46, further comprising means for subsequently writing the cached data to the destination address.

48. The computer system of claim 47, in which software executing on the processing unit exercises control over the cache residency of the data after the completion of the virtual copy operation.

* * * * *